United States Patent [19]

Grubb

[11] 4,297,168

[45] Oct. 27, 1981

[54] NUCLEAR FUEL ASSEMBLY AND PROCESS
[75] Inventor: Willard T. Grubb, Schenectady, N.Y.
[73] Assignee: General Electric Company, Schenectady, N.Y.
[21] Appl. No.: 700,735
[22] Filed: Jun. 29, 1976
[51] Int. Cl.$^3$ .................................................. G21C 3/18
[52] U.S. Cl. .................................... 376/418; 252/637; 376/421; 376/417
[58] Field of Search .............. 252/301.1 R; 176/91 R, 176/82, 91 SP, 93 BP, 68, 69

[56] References Cited

U.S. PATENT DOCUMENTS 3,494,785  2/1970  Barr et al. ........................ 176/91 SP
3,663,182  5/1972  Hamling ........................... 252/301.1 R
3,826,754  7/1974  Grossman et al ............ 252/301.1 R

FOREIGN PATENT DOCUMENTS 933500  8/1963  United Kingdom ............ 176/91 R

Primary Examiner—Charles T. Jordan
Assistant Examiner—Edward F. Miles
Attorney, Agent, or Firm—Leo I. MaLossi; James C. Davis, Jr.; Stephen S. Strunck

[57] ABSTRACT

Rupture of boiling water reactor nuclear fuel cladding resulting from embrittlement by fission product cadmium is prevented by adding the stoichiometrically equivalent amount of $V_2O_4$ or $V_2O_5$ to the fuel.

10 Claims, No Drawings

NUCLEAR FUEL ASSEMBLY AND PROCESS

The present invention relates generally to the art of corrosion prevention in nuclear reactors and is more particularly concerned with novel boiling water reactor nuclear fuel compositions and with a new method involving the use of $V_2O_4$ or $V_2O_5$ or mixtures thereof to prevent embrittlement of nuclear fuel cladding by cadmium.

CROSS REFERENCES

This invention is related to those of my following two patent applications assigned to the assignee hereof and filed of even date herewith:

Patent Application Ser. No. 700,736, filed June 29, 1976, entitled "Nuclear Fuel Assembly and Process" which discloses and claims the concept of preventing embrittlement of fuel cladding by chemically inerting fission product cadmium through the use of relatively small but effective amounts of gold, silver or palladium or mixtures thereof.

Patent Application Ser. No. 700,737, filed June 29, 1976, entitled "Nuclear Fuel Assembly and Process" which discloses and claims the concept of preventing embrittlement of fuel cladding by chemically inerting fission product cadmium through the use of relatively small but effective amounts of copper ferrite or copper titanate chemical displacement compounds.

BACKGROUND OF THE INVENTION

Boiling water reactor nuclear fuel in suitable compacted form is usually enclosed in corrosion-resistant, non-reactive, heat-conductive containers or cladding which in assembly may take the form of rods, tubes or plates. A plurality of fuel elements of this kind are assembled in a fixed spaced relation in a coolant flow channel, and a number of these assemblies are combined to form a reactor core capable of a self-sustained fission reaction. The core is contained in a reactor vessel through which water as a coolant is run continuously.

A prime necessity in the operation of a nuclear reactor is the containment of radioactive fission products. The cladding serves this purpose, preventing release of those products into the coolant and, in addition, preventing contact and chemical reaction between the nuclear fuel and the coolant. Common cladding materials include zirconium and its alloys, particularly Zircaloy-2 and Zircaloy-4.

During operation of a nuclear powered reactor, a fissionable atom of U-233, U-235, Pu-239 or Pu-241 undergoes a nuclear disintegration producing an average of two fission products of lower atomic weight and great kinetic energy. Some of such fission products, including iodine and bromine, have been found or considered to have corrosive effects on the cladding. Thus, cladding failure resulting from such corrosion has been observed during operation of nuclear reactors over long periods of time.

As disclosed and claimed in U.S. Pat. No. 3,826,754, assigned to the assignee hereof, certain additives can be incorporated in nuclear fuels to prevent corrosive attack on cladding by fission products. This result is achieved without offsetting disadvantage by chemical combination or association of the additives with deleterious fission products whereby those fission products are prevented from migrating in the nuclear fuel to reach the cladding.

SUMMARY OF THE INVENTION

This invention is based upon my discovery that cadmium, which is produced in only relatively small amounts in the fission of an atom of U-233, U-235, Pu-239, Pu-241 or the like, has a markedly deleterious effect upon common nuclear fuel cladding materials. In particular, I have found that embrittlement of zirconium alloy cladding is caused by cadmium in the temperature range of 300°–340° C. Thus, such destructive attack occurs in the presence of solid cadmium at 300° C., liquid cadmium at 340° C. and cadmium dissolved in liquid cesium at any temperature in that range. Still further, the presence in nuclear fuel of the immobilizing additives of the prior art does not prevent or limit this embrittling effect of cadmium.

This invention is additionally based upon my discovery that $V_2O_4$ and $V_2O_5$ have the capability individually and in combination of reacting with cadmium under normal boiling water reactor operating conditions and thereby preventing embrittlement of nuclear fuel cladding by cadmium in liquid or solid form or in solution in liquid cesium. Further, I have found that they may be admixed with a nuclear fuel as a simple additive or used as a component of a multifunctional fuel additive, or they may be applied as a coating on fuel pellets or on the cladding inside surface, or distributed as a layer between fuel pellets. However, in whatever form and manner the additive is used for this cadmium-inerting purpose, it should be so proportioned to insure that there will not be a substantial amount of cadmium free to contact and embrittle the fuel cladding. Thus, $V_2O_4$ or $V_2O_5$ or admixtures thereof should be used in amount between 0.0025 and 0.025 weight percent on the basis of the nuclear fuel material, and preferably in amount about 0.0075 weight percent on that same basis.

It will be understood by those skilled in the art that this invention has both process and composition aspects, the new process comprising the step of providing in contact with nuclear fuel material an amount of vanadium oxide cadmium-immobilizing additive effective to prevent cadmium embrittlement of nuclear reactor structural components such as fuel cladding at reactor operating temperatures.

In its composition-of-matter aspect, in general, this invention comprises an oxide composition nuclear fuel material in compacted pellet form containing an amount of $V_2O_4$ or $V_2O_5$ or admixture thereof effective to immobilize cadmium resulting from the nuclear fission chain reactions of the fuel material by reacting with the cadmium and thereby prevent reaction of the cadmium with the metal of nuclear fuel cladding under reactor operating conditions.

DETAILED DESCRIPTION OF THE INVENTION

In the preferred practice of this invention, the additive is associated with the fuel in any suitable manner as by mechanically blending the additive in power form with the nuclear fuel material in a similar finely-divided condition. It is also feasible, according to this invention, to apply the additive as a coating to part or all of the surface of a fuel pellet, or it may be applied as a coating on the inside surface of the cladding for contact with fuel pellets loaded therein. As indicated above, it is also contemplated that the additive in powder form can be disposed in the pellet assembly as it is loaded into cladding. In any event, it is desirable that the vanadium oxide additive be distributed in respect to the nuclear fuel material to insure that substantially all cadmium generated as a fission product in the operation of the reactor comes into contact with and is reacted with the additive during reactor operation so as to obtain the new results and advantages of this invention described above.

Generally, the new and highly useful cadmium immobilization result of this invention can be achieved in accordance with relatively small amounts of $V_2O_4$ or $V_2O_5$. Thus, 0.16 gram of $V_2O_5$ is sufficient for the present purpose in a reactor operation at 20,000 megawatt days per metric ton of uranium in a boiling water reactor fuel rod which generated 0.11 gram of cadmium. In the best practice presently contemplated, the vanadium oxide additive will be present in association with the fuel in one or the other of the several alternative ways described above in such stoichiometric amount. Appreciably less than such stoichiometric amount will leave the way open to some extent for cadmium embrittlement of cladding, while use of substantially more than the stoichiometric amount burdens the system with inert material, using space that should be occupied by fissile or fertile material.

When the additive is incorporated in the fuel elements, they make take any desired geometric form or configuration, but it is preferred that the nuclear fuel material be in the form of right cylindrical pellets which are incorporated in a tubular cladding of a zirconium alloy. The swelling of the pellets in the cladding is accommodated by providing porosity in the fuel pellet or by forming it with dished ends or axial openings or the like to accommodate such swelling.

From the foregoing description, it will be understood that this invention achieves the chemical inerting of reactive fission product cadmium through the use of $V_2O_4$ or $V_2O_5$ additives which react with cadmium under normal nuclear reactor operating conditions to form stable compounds so that fission product cadmium is not available or free to react with or attack fuel cladding or any other metal that it may come in contact with during reactor operation. In this manner, the additive which is effective for the purposes of this invention blocks potential cladding-fission product reaction and so increases the cladding reliability and useful life.

In a test conducted for the purpose of confirming that cadmium embrittles zirconium alloy cladding material under elevated temperature conditions, a Zircaloy-2 tensile test specimen was broken in argon at 300° C. after undergoing a 75 percent reduction in cross-sectional area and with a plastic strain of about 15 percent following a maximum stress of 60,000 psi. Fracture morphology was ductile.

Then in a repetition of that test but for the presence of cadmium in contact with the test specimen, breakage occurred as a transgranular cleavage fracture with zero reduction in area and zero plastic strain at maximum stress of 40,000 psi before reaching the yield point of the specimen. Many incipient cracks were observed in the specimen on conclusion of the test.

Similar results to those of the latter test were obtained in subsequent tests performed in the same manner but at temperatures between 250° C. and 350° C. involving the use of solid cadmium (below 321° C.), liquid cadmium (above 321° C.) and cadmium dissolved in liquid cesium at temperatures both above and below 321° C.

In testing the basic new cadmium inerting concept of this invention, oxides of variable-valence metals were equilibrated with cadmium at 350° C. in evacuated quartz capsules in a thermal gradient furnace. Either a reaction occurred or it did not; and where the test result was positive in this sense, the compounds formed were stable up to the approximately 1000° C. temperature limit of the furnace. As indicated above, $V_2O_4$ and $V_2O_5$ did so react under these conditions in this test with the apparent formation of cadmium oxide and a lower oxide of vanadium. No such reaction was observed in tests of this kind involving the use of either $TiO_2$ or $Nb_2O_5$, $CeO_2$ or depleted $UO_2$.

In out-of-pile experiments performed with $V_2O_5$, it was found that 0.1 gram of cadmium was immobilized or gettered by 1.6 grams of $V_2O_5$ at temperatures between 300 and 950° C. (the maximum test temperature). Actually, on visual examination it was observed that only about one-tenth of the total volume of $V_2O_5$ was darkened (i.e., changed in color from yellow to black), indicating that a reaction of one-to-one stoichiometry had taken place.

In using $V_2O_4$ or $V_2O_5$ or mixtures of them in accordance with this invention to fill the gap between the nuclear fuel and the cladding of a fuel rod, the vanadium oxide material in powder form may be packed lightly in place. With the volume of that gap typically being about 14.5 cc, a gap-filling load would be about 11.6 grams, which would insure inerting of the cadmium released at all locations in the fuel rod during reactor operation.

When it is desired to provide the embrittlement protection of this invention in locations between fuel pellets, a 5-mil layer of $V_2O_5$, for example, may be disposed between each pair of pellets. Thus, in a typical fuel rod assembly of 100 fuel pellets, each of 0.87 square centimeters end surface area, a total of about 0.9 gram of $V_2O_5$ will be incorporated in the fuel rod. As indicated above, this amount will be in substantial excess of the stoichiometric equivalent of the cadmium produced in the normal useful life of the fuel rod in the typical boiling water nuclear reactor operation.

I claim:

1. For use in a nuclear reactor, an oxide composition nuclear fuel material in compacted pellet form containing at least one fissionable isotope and an amount of an oxide selected from the group consisting of $V_2O_4$ and $V_2O_5$ and mixtures thereof effective to immobilize cadmium resulting from nuclear fission chain reactions of the nuclear fuel material through a reaction between the said cadmium and the said oxide and thereby prevent cadmium embrittlement of nuclear fuel cladding at reactor operating temperatures.

2. The composition of claim 1 in which the nuclear fuel material comprises compounds selected from the group consisting of uranium oxide compounds, plutonium oxide compounds, thorium oxide compounds and mixtures thereof.

3. The composition of claim 1 in which the nuclear material comprises uranium oxide compounds.

4. The composition of claim 1 in which the immobilizing additive is $V_2O_5$.

5. The composition of claim 1 in which the immobilizing additive is $V_2O_4$.

6. The composition of claim 1 in which the immobilizing additive is present in the nuclear fuel in an amount between about 0.0025 and 0.025 weight percent on the basis of the nuclear material.

7. The composition of claim 1 in which the immobilizing additive-content of the nuclear fuel is about 0.0075 weight percent on the basis of the nuclear material.

8. The method of immobilizing fission product cadmium generated in nuclear fuel material of oxide composition in pellet form containing at least one fissionable isotope which comprises the step of providing in contact with the nuclear fuel material an amount of a substantially stoichiometric oxide selected from the group consisting of $V_2O_4$ and $V_2O_5$ and mixtures thereof effective to immobilize the cadmium generated in the nuclear fission chain reaction of the nuclear fuel material through a reaction between the said cadmium and the said vanadium oxide and thereby prevent cadmium embrittlement of nuclear fuel cladding at reactor operating temperatures.

9. The method of claim 8 in which the additive is mixed with and distributed through the nuclear fuel material.

10. The method of claim 8 in which the additive is disposed in contact with the pellet of nuclear fuel material.

* * * * *

UNITED STATES PATENT AND TRADEMARK OFFICE
CERTIFICATE OF CORRECTION

PATENT NO. : 4,297,168
DATED : October 27, 1981
INVENTOR(S) : Willard T. Grubb

It is certified that error appears in the above—identified patent and that said Letters Patent is hereby corrected as shown below:

col. 5, lines 7 & 8 (claim 8) delete " a substantially stoichiometric" and substitute therefor -- an --

Signed and Sealed this

Twenty-third Day of February 1982

[SEAL]

Attest:

GERALD J. MOSSINGHOFF

*Attesting Officer*  Commissioner of Patents and Trademarks